Dec. 24, 1929. J. ZITZERMAN 1,741,089
CONTAINER AND SERVER FOR SPREADS
Filed May 28, 1928
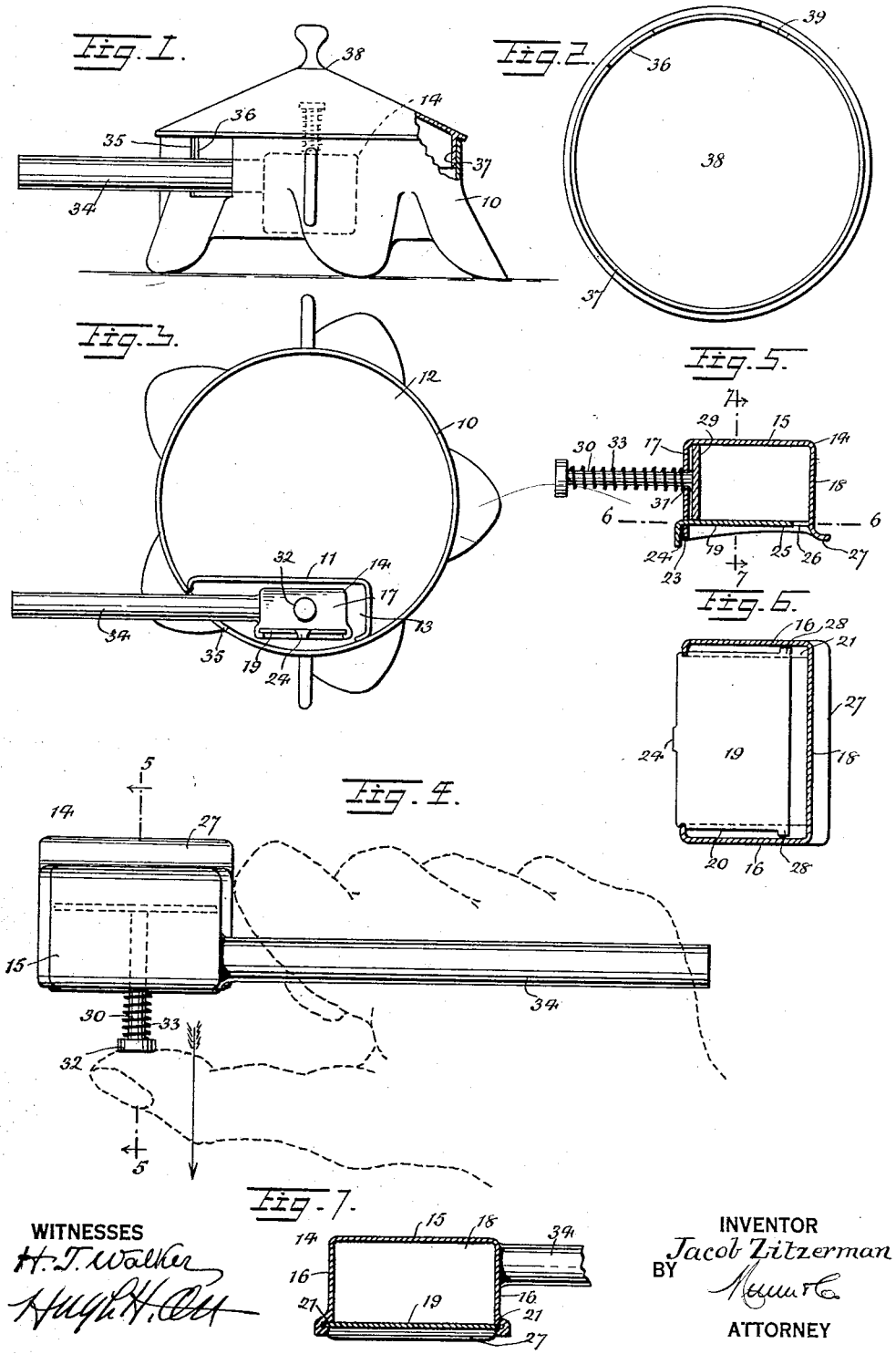
WITNESSES
H. T. Walker
INVENTOR
Jacob Zitzerman
BY
ATTORNEY Patented Dec. 24, 1929

1,741,089

UNITED STATES PATENT OFFICE

JACOB ZITZERMAN, OF NEW YORK, N. Y.

CONTAINER AND SERVER FOR SPREADS

Application filed May 28, 1928. Serial No. 281,347.

This invention relates to tableware, and has particular reference to a container and server for spreads, such as butter, jelly, cheese or other analogous edible substances which are usually served by spreading the same on slices of bread, toast or crackers.

One of the principal objects of the invention resides in the provision of an improved implement for facilitating the uniform spreading of butter or the like over the surface of a slice of bread or its equivalent.

More specifically, the invention contemplates a spreading implement of the character set forth which includes a hollow receiving body for the reception of a quantity of the substance to be spread, which body is provided with an outlet extending transversely to the path or movement in which the same is caused to travel during the spreading operation, together with means within the body adapted to be manually advanced toward the outlet for discharging the contents therethrough during the movement of the same over the surface being spread.

The invention furthermore comprehends a container for the spread which is equipped with a compartment for the reception of the spreading instrument when the same is not in active use whereby said implement will be covered and concealed to protect the same from dust.

Other objects of the invention reside in the comparative simplicity of construction of the container and serving implement and the mode of use of the latter, the economy with which they may be produced and the general efficiency derived therefrom.

With the above recited and above objects in view, reference is had to the following description and accompanying drawings, in which there is exhibited one example or embodiment of the invention, while the claims define the actual scope of the same.

In the drawings:

Figure 1 is a side view of the container with the server arranged therein and covered by the cover for the container.

Figure 2 is an inverted plan view of the cover.

Figure 3 is a top plan view of the container with the cover removed and illustrating the serving implement in place.

Figure 4 is a plan view of the server illustrating the manner in which the same is used.

Figure 5 is a sectional view through the serving implement taken approximately on the line indicated at 5—5 in Figure 4.

Figure 6 is a sectional plan view taken approximately on the line 6—6 of Figure 5.

Figure 7 is a sectional view taken approximately on the line 7—7 of Figure 5.

Referring to the drawings by characters of reference, the container consists of a cup shaped body 10 provided with a partition 11 defining respectively compartments 12 and 13, the former being designed to receive an edible spread, such as butter, cheese, jelly or the like, while the latter compartment 13 is adapted to receive the substantially rectangular hollow body 14 of a spreading implement which will be hereinafter described. The implement body includes an upper wall 15, side walls 16, a front wall 17 and a rear wall 18, which walls 16, 17 and 18 depend from the top wall 15. A bottom wall 19 is slidably associated with the body by the engagement of its side edges 20 in grooves 21 on the inner surfaces of the opposite side wall 16 and through a slot 23 in the front wall 17. The front edge of the bottom wall 19 is provided with a downturned medial finger 24 which projects slightly below the lower edge of the front wall 17 and which acts as a stop for engagement with the front wall 17 to limit the inward sliding movement of the bottom wall. The bottom wall is of such a length that its rear edge 25 is spaced from the rear wall 18 when the finger 24 engages the front wall 17 to define an outlet opening 26 between said edge 25, the rear wall 18 and the side walls 16. The rear wall 18 is provided with a downwardly and rearwardly curved spreading lip 27, the purpose of which will be hereafter set forth. The bottom wall 19 is limited in its outward movement by means of laterally projecting lugs 28 which engage with the inner surface of the front wall 17 outwardly of the slot 23. A follower or pusher element 29 is arranged vertically within the body 14 and snugly fits between the side wall 16 and the top and bottom walls 15 and 19 and said follower or pusher element is provided with a stem 30 which projects outwardly through an opening 31 in the front wall 17. The stem 30 is provided with a notched head or button 32 at its outer end and suitable means is provided for normally moving the follower element 29 toward the front wall 17 and for tensioning the same against movement in the opposite direction. As illustrated, this means is in the nature of a coil expansion spring 33 which surrounds the stem 30 and is interposed between the head or button 32 and the outer surface of the front wall 17. A laterally projecting handle 34 is attached to one of the side walls 16 of the body 14, and in order to accommodate the handle when the implement is arranged in the compartment 13 of the container body, a notch 35 is formed in the wall of the container 10 and a corresponding notch 36 is formed in the depending flange 37 of the container cover 38. The flange 37 is provided with a circumferentially spaced notch 39 so that the notches 36 and 39 will clear the partition 11 when the cover is applied.

In use and operation, assuming the container compartment 12 to be filled with butter or an analogous edible spread, the spreading implement is removed from its compartment 13 and the bottom wall 19 is slid outwardly to the extent of its movement. The butter or spread within the compartment 12 is scooped out by the implement until the interior of the body 14 is charged with a supply. The bottom wall 19 is then moved to its closed position as illustrated in Figure 5. By grasping the handle 34 in the manner illustrated in Figure 4 and applying the thumb to the head or button 32, it is obvious that the implement may be moved over the surface of a slice of bread or toast in the direction indicated by the arrow in Figure 4 while simultaneous pressure is exerted on the head or button 32 of the stem 30 to advance the follower element 29 toward the wall 18 for discharging through the outlet 26 a substantially flat thin ribbon of the contents. By properly manipulating the implement, the spreading lip 27 at the trailing edge of the outlet opening 26 will uniformly spread the ribbon over the surface of the bread.

From the foregoing, it will thus be seen that a highly sanitary and efficient spreading implement and container for spreads has been devised which greatly facilitates the uniform spreading of butter or other edible substances over slices of bread, toast or crackers.

What is claimed is:

1. A spreading implement of the character described including a hollow receiving body for the substance to be spread, a handle projecting from one side of said body, said body having an outlet extending in the same direction as the handle and transversely to the path of movement of the travel of the implement during the spreading operation and follower means within said body adapted to be manually advanced toward the outlet slot for dispensing the contents during the movement of the same over the surface being spread.

2. A spreading implement of the character described including a hollow receiving body for the substance to be spread, a handle projecting from one side of said body, said body having an outlet extending in the same direction as the handle and transversely to the path of movement of the travel of the implement during the spreading operation, follower means within said body adapted to be manually advanced toward the outlet slot for dispensing the contents during the movement of the same over the surface being spread and a spreading lip depending from said body at the trailing edge of the outlet.

3. A spreading implement of the character described including a hollow receiving body for the substance to be spread, a handle projecting from one side of said body, said body having an outlet extending in the same direction as the handle and transversely to the path of movement of the travel of the implement during the spreading operation, follower means within said body adapted to be manually advanced toward the outlet slot for dispensing the contents during the movement of the same over the surface being spread and a downwardly and rearwardly curved spreading lip depending from said body at the trailing edge of the outlet.

4. A spreading implement of the character described including a hollow receiving body for the substance to be spread, a handle projecting from one side of said body, said body having an outlet extending in the same direction as the handle and transversely to the path of movement of the travel of the implement during the spreading operation and follower means within said body adapted to be manually advanced toward the outlet slot for dispensing the contents during the movement of the same over the surface being spread, said body having a charging opening and a closure therefor.

5. In a spreading implement of the character described, a hollow receiving body for the substance to be spread including a top wall and depending side, front and rear walls, a bottom wall slidably associated with the side and front walls and adapted when closed to be spaced from the rear wall to define an outlet extending transversely to the path of movement in which the implement travels during the spreading operation, follower means within said body normally moved toward the front wall and tensioned against movement in the opposite direction, means extending through the front wall and connected with the follower element for manually advancing the same toward the outlet for dispensing the contents during the movement of the same over the surface being spread and a laterally projecting handle from one of said side walls.

6. In a spreading implement of the character described, a hollow receiving body for the substance to be spread including a top wall and depending side, front and rear walls, a bottom wall slidably associated with the side and front walls and adapted when closed to be spaced from the rear wall to define an outlet extending transversely to the path of movement in which the implement travels during the spreading operation, follower means within said body normally moved toward the front wall and tensioned against movement in the opposite direction, means extending through the front wall and connected with the follower element for manually advancing the same toward the outlet for dispensing the contents during the movement of the same over the surface being spread and a laterally projecting handle from one of said side walls, the said rear wall having a downwardly and rearwardly curved spreading lip disposed at the trailing edge of the outlet.

Signed at New York in the county of New York and State of New York this 26th day of May A. D. 1928.

JACOB ZITZERMAN.